United States Patent [19]
Cook et al.

[11] Patent Number: 5,342,428
[45] Date of Patent: Aug. 30, 1994

[54] SEPARATION OF FREE LEAD FROM ALUMINUM BEVERAGE CANS

[75] Inventors: John O. Cook, Muscle Shoals; Ray D. Peterson, Florence, both of Ala.

[73] Assignee: Reynolds Metals Company, Richmond, Va.

[21] Appl. No.: 106,171

[22] Filed: Aug. 13, 1993

[51] Int. Cl.$^5$ ............................................... C22B 7/00
[52] U.S. Cl. ......................................... 75/401; 75/403
[58] Field of Search .................. 75/401, 403; 266/901, 266/205

[56] References Cited

U.S. PATENT DOCUMENTS

| | | | |
|---|---|---|---|
| 4,491,473 | 1/1985 | Bowman et al. | 75/63 |
| 4,498,523 | 2/1985 | Bowman et al. | 164/477 |
| 5,054,747 | 10/1991 | Perry | 266/205 |

Primary Examiner—Melvyn J. Andrews
Attorney, Agent, or Firm—Alan M. Biddison

[57] ABSTRACT

A method for removing free lead from a feed stream of used aluminum beverage cans (UBC) to reduce the total lead content of the feed stream. The UBC material is shredded, heated to a temperature above the lead melting point, and agitated to cause the molten lead to fragment and form small particles. The material is then screened to form a second particle stream containing a large percentage of any free lead present in the feed stream and a third particle stream comprised primarily of shredded UBC. The second particle stream is introduced into a fluidized bed to separate the fines from the aluminum particles, the fines containing the majority of the free lead. The aluminum-enriched remaining particles, after separation from the fines, are conveyed for subsequent reprocessing.

14 Claims, 2 Drawing Sheets

SEPARATION OF FREE LEAD FROM ALUMINUM BEVERAGE CANS

BACKGROUND OF THE INVENTION

1. Field of the Invention

The present invention relates to a method for separating free lead from shredded aluminum used beverage cans (UBC's) for recycling. More particularly, the present invention relates to a method for providing recyclable aluminum UBC material in particulate form from which a major proportion of any free lead has been separated.

2. Description of the Related Art

The recycling of UBC's has been encouraged for some time as a way of reusing previously processed aluminum and thereby helping to conserve a substantial quantity of the energy that would otherwise be needed to obtain usable aluminum from bauxite. Recycling of UBC's also helps to preserve the environment by encouraging the collection of UBC's and thereby removing them from streets, roadways, and other public places.

UBC's can contain aluminum alloys, ferrous materials, and a number of other types of trash materials. Separation of steel or other ferrous-based materials is easily accomplished by magnetic devices, in view of the magnetic permeability of ferrous-based alloys as compared with that of aluminum--based alloys. Non-metallic materials, such as paper and plastics, can be separated either by air classification or by heating the material to an appropriate temperature.

If desired, the several types of aluminum alloys used to make beverage cans can themselves be separated from each other. For example, all-aluminum beverage cans typically have can bodies made from one alloy and can ends made from another alloy. Processes for separating such alloys from each other are disclosed in U.S. Pat. No. 4,491,473 and in U.S. Pat. No. 4,498,523, each of which issued to Kenneth A. Bowman et al., the '473 patent on Jan. 1, 1985, and the '523 patent on Feb. 12, 1985.

In order to encourage the collection of UBC's for recycling, the promoters of recycling efforts, of which the aluminum producers themselves are in the forefront, frequently provide financial incentives in the form of cash payments to those who collect and present recyclable UBC's. The payments made to those who present recyclable UBC-containing material are based upon the weight of such material that is presented for recycling. However, in addition to including UBC's, the material offered for recycling very often contains other, undesirable, non-ferrous materials that should not be present in aluminum metal intended to be reused for making certain types of cans. Such undesirable materials should be separated from the collected recycle material.

Among the undesirable materials present in recycle material is lead, which sometimes is present in combination with aluminum in alloyed form. Oftentimes, however, lead is present in recycle material in the form of free lead that has been either inadvertently or intentionally included in the stock of UBC-containing recycle material, and that is not alloyed with the aluminum container metal. Free lead can be present in UBC-containing recycle material in many different forms, such as tire weights, fishing weights, lead foils, lead shot, car batteries, solder, padlocks, and lead-containing dust.

Restrictions have been placed upon the amount of lead that can be present in the metal from which aluminum alloy food containers, such as beverage cans, is made. For example, the Conference of Northeastern Governors (CONEG), which includes the governors of several of those northeastern states that strongly emphasize recycling efforts, such as by adding deposit charges to metallic beverage containers to encourage their return for reuse, have mandated a maximum lead and cadmium content of 100 ppm. in food container materials.

Some small portion of the lead present in UBC-containing recycle materials used to make food containers is alloyed with the aluminum. The amount of alloyed lead in UBC's can vary based upon the source of the can stock metal, but it can range from about 40 ppm. to about 60 ppm., which is less than the CONEG-imposed limitation. The presence of such alloyed lead is not intended, but arises as a result of the inadvertent inclusion in the aluminum alloys of small amounts of impurities. One way to reduce a high lead content of UBC-containing recycle material is to, in effect, dilute the amount of lead in the material by adding pure aluminum to the material, or by combining the material with recycled aluminum alloy known to have a low lead content.

Free lead is not always present in UBC-containing recycle material; however, when it is present, its removal will help meet the lead content limitation imposed by CONEG.

It is therefore an object of the present invention to provide an effective and efficient method for removing free lead from UBC-containing recycle material.

SUMMARY OF THE INVENTION

Briefly stated, in accordance with one aspect of the present invention, a method is provided for reducing the weight fraction of a minor metallic constituent of a starting material mixture of at least two metals, wherein each of the metals have different melting points. The method includes providing a starting material, such as a particle feed stream of particles of used beverage containers. The particle feed stream is introduced into a heating zone to heat the particles to a temperature above the melting temperature of a first metal having a lower melting temperature and below the melting temperature of a second metal in the particle feed stream having a higher melting temperature- The heated particle feed stream is agitated to cause the first metal to separate from larger particles of the second metal, and particles having a predetermined maximum particle size, for instance about $\frac{3}{8}$ of an inch (9.5 mm), are separated from the heated particle feed stream to provide a fine particle feed stream. The fine particle feed stream is fluidized to separate fines from larger particles, and the larger particles are collected for subsequent reuse while the fines are either subsequently processed or discarded.

DESCRIPTION OF THE PREFERRED EMBODIMENTS

In the course of preparing UBC-containing material for reprocessing into new cans, the material is passed through a suitable separator (not shown) for separating any ferrous-metal-based components that might be present in the material. Such a separation operation can be performed by providing a suitable magnetic field and by passing the material through the field, so that the magnetically permeable ferrous materials will be retained in the field while the remaining material will pass through the field unimpeded, as will be appreciated by those skilled in the art.

After the magnetically permeable materials have been separated, the resulting non-ferrous material is passed through a shredder to reduce the size of the material. Such shredding operations are well known to those skilled in the art and therefore will not be further described herein. As is well known to those skilled in the art, the separation of magnetic materials could occur after the UBC's have been shredded instead of before.

The particles resulting from the shredding operation include shredded parts of aluminum cans. In that regard, as used herein the term "aluminum can" is intended to include cans made from different aluminum alloys, such as Aluminum Association (AA) alloy 5182, from which the top ends of aluminum cans are typically made, and AA alloy 3104, from which the bottom ends and the bodies or sidewalls of aluminum cans are typically made. The ends and bodies of aluminum cans generally have some type of lacquer coating that is applied to the inner surfaces of the ends, and some of the ends could additionally have printed material thereon. The can bodies usually have both an interior lacquer coating as well as an external decorative coating or series of coatings in the form of printed materials and designs to identify the contents, and also to identify the manufacturer or distributor of the product contained within the cans. It is preferable before remelting of the aluminum particles and other materials that are present in the UBC-containing recycle material that any interior lacquer coatings and also any exterior decorative or protective coatings be removed in order to improve metal recovery.

Figure 1:
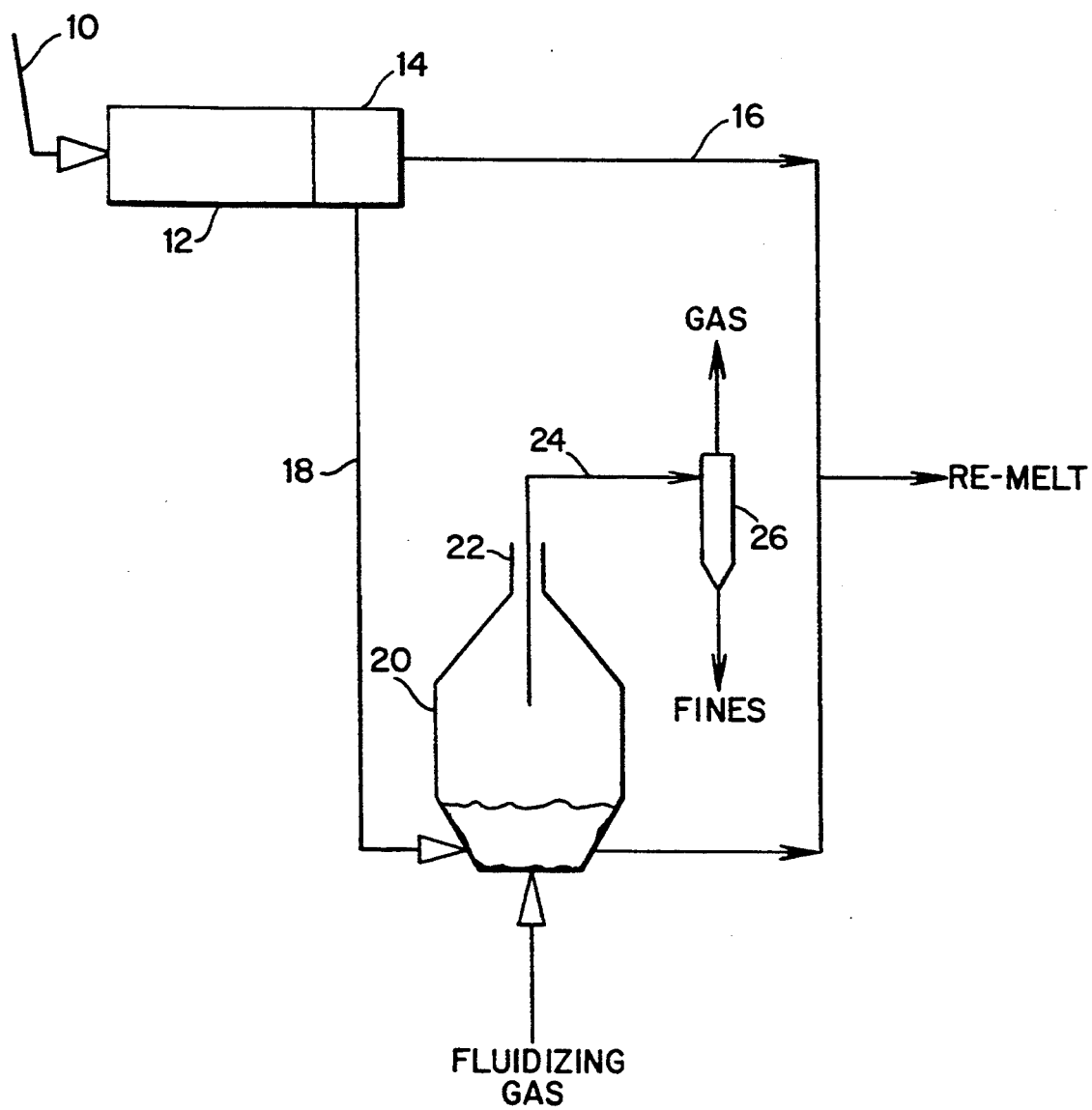
FIG. 1 is a flow diagram, in schematic form, showing a sequence of steps in accordance with the present invention for treatment of UBC-containing recycle material for removal of free lead.

The lacquer and other coatings are removed from the shredded UBC-containing materials by passing a first stream of shredded particles 10 through a delacquering kiln 12, which is shown schematically in FIG. 1. Kiln 12 includes an enclosed chamber within which the shredded particles are heated, preferably to a temperature of about 500° C. (932° F.) to vaporize and drive off the lacquer and other coating materials. That temperature level is well above the melting temperature of lead, which is 328° C. (622° F.) and it is below the melting points of the several commonly used aluminum can alloys, which are greater than about 600° C. (1100° F.). Delacquering kiln 12 is preferably a rotary kiln, so that the particles are tumbled as they pass through the kiln from the inlet to the outlet. The tumbling action causes the lead, which is in the molten state by virtue of the temperature within the kiln, to assume the form of droplets of molten lead that are broken up into fine particles of lead by repeated impacts with the aluminum alloy particles within the kiln. Because lead has a very low vapor pressure at atmospheric pressure and at the temperature at which the kiln is maintained, the free lead will not vaporize to any appreciable extent, and therefore the majority of the free lead contained in the particle stream as it leaves the kiln will be in the form of fine sized particles.

The kiln can advantageously be inclined, so that the outlet is at a lower elevation than the inlet, to facilitate the flow of the particles through the kiln. One possible form of delacquering kiln and associated equipment is illustrated and described in U.S. Pat. No. 5,055,037, which issued Oct. 8, 1991, to Ophneil H. Perry, the contents of which are herein incorporated by reference.

The separation of the lead particles from the aluminum alloy particles could be effected by merely screening the materials as they leave the rotary kiln, such as by screening at 20 mesh. However, it is difficult to screen high volumes of fine sized materials effectively. In addition, screening performed at such a high temperature is effective for only a limited time, because the screen openings will quickly become plugged with molten and partially solidified lead after only a few hours operation, and the screen must then either be cleaned or replaced.

To permit substantially continuous separation of the lead particles from the aluminum particles as they leave the kiln, a trommel or rotating screen 14, is placed at the discharge end of kiln 12 to remove the majority of the large material. Most of the delacquered shredded material that leaves kiln 12, of the order of about 80% to 90% by weight, is larger than a first predetermined size, for instance about ⅜ inch (9.5 mm), and therefore trommel 14 preferably has a screen size selected to permit the passage of materials having a particle size of ⅜ inch (9.5 mm) and smaller. It has been found that because the trommel rotates, the trommel motion tends to dislodge small shredded particles that would otherwise remain in place on a stationary screen. The increased volume of shredded particles passing through the trommel screen, combined with the motion of the trommel, significantly reduces the buildup on the trommel screen of molten lead and other materials having a tendency to blind the screen, as compared with a fine sized stationary screen. In addition, the components of the trommel are not in constant contact with the heated materials because of the trommel's rotation, which also increases service life. As a result, the effective operating time for a trommel is considerably longer than that for a stationary screen before screen cleaning or replacement becomes necessary.

The larger shredded and delacquered particles that remain on trommel screen 14 are removed in a known manner to form a third stream of large particles 16. Stream 16 can be conveyed directly to a furnace (not shown) for remelting, or it can be combined with other, previously shredded and preferably delacquered materials, as desired. A second stream of smaller-sized particles 18 that pass through the trommel screen preferably is conveyed to a fluidized bed 20 to separate particles less than a second predetermined size from larger particles. In that regard, it has been found that the smaller particles within stream 18 contain most of the free lead that has been separated from the incoming shredded UBC recycle material 10. Alternatively, stream 18 can be accumulated in batches and the lead contact of the batches analyzed to determine lead content. Depending on its lead content, a batch can be recombined with stream 16 (low lead content), melted to make an alloy not intended for contact with food, conveyed to fluidized bed 20, or discarded.

Fluidized bed 20 is operated in such a manner as to provide a sufficient upward velocity of air within the bed to cause the smaller, fine particles within stream 18 to be carried through the gas outlet 22 of fluidized bed 20. The air velocity should be sufficient to exceed the terminal settling velocity in air of the fine particles. In that connection, because the smaller, fine particles, which include dirt and dust as well as lead particles, are lighter in weight and are in the form of rounded particles, or particles of spherical shape, they are readily carried upwardly by the fluidizing air. The larger particles of shredded aluminum are not rounded particles, but are in the form of small, wafer-like platelets having substantial flat or nearly flat portions. Provided the velocity of the fluidizing air is properly selected, which is a function of the cross-sectional area of the fluidizing bed and the volume of particulate material supplied to the bed, the aluminum particles will not be carried out of the fluidizing bed by the fluidizing air stream. Instead, the aluminum particles will be tumbled by the air stream and will ultimately assume an orientation in which the substantially flat surfaces of the particles are aligned with the direction of air flow. As a consequence, the aluminum particles when so oriented relative to the flow of fluidizing air will present less cross-sectional area and therefore less resistance to air flow, and they will fall downwardly to the bottom of the bed, where they can be withdrawn for subsequent processing, such as melting to make can stock. They can optionally be recombined with stream 16 of oversize particles that was removed from trommel 14 for subsequent processing.

Fluidized bed 20 is operated in such a manner that the smaller particles that exit from air outlet 22 are less than about 12 mesh in size, and preferably the size of the particles is less than about 20 mesh in size. Those separated, smaller size particles are conveyed through a conduit 24 to a cyclone separator 26 that separates the lead and dirt particles from the air stream leaving air outlet 22, after which the lead and dirt particles are collected and disposed of.

EXAMPLE

A small-scale, laboratory test was conducted on a small sample size of UBC material. The material was a two-component mixture of UBC particles and was prepared by combining a first component containing 2400 grams of screened, $-\frac{3}{8}$ inch (9.5 mm) particle size shredded UBC's with a second component containing 300 grams of previously collected $-12$ mesh UBC particles. The first, $-\frac{3}{8}$ inch (9.5 mm) component, based on past experience, was assumed to contain approximately 54 ppm. lead, and the second, $-12$ mesh component was assumed to contain 470 ppm. of lead. The components were selected in order to provide a combined sample that included an assumed value of about 100 ppm. of lead, of which about 50 ppm. was free lead, all of which was assumed to have been introduced by way of the $-12$ mesh component. The balance of the lead present was lead that was in alloyed form. This material was intended to simulate the fine size materials from the trommel 14, that is, particle stream 18.

A sample of the delacquered UBC material prepared as indicated above and having a weight of 171.4 grams was introduced into a laboratory-size fluidized bed having an inner diameter of 13.3 cm. (5.25 inches). The air flow rate through the fluidized bed was maintained at 24 scfm. for 30 seconds, and the output from the bed was in the form of 163.8 grams of shred and 4.2 grams of fines. 3.4 grams of material were unaccounted for.

After metal consolidation by salt fluxing of the shred material, 148.2 grams of metal were recovered, of which the lead content was 55 ppm. The free lead in the shred was 0.493 mg., and the calculated lead removal efficiency, based upon the starting free lead content and the final free lead content, was 95.12%.

Additional individual samples containing about 170 grams each were separately introduced into the fluidized bed, and air flow rates through the fluidized bed were varied from 21 scfm. to 27 scfm. The corresponding linear air velocities varied from 27.6 m/sec. to 35.5 m/sec. (90.6 ft./sec. to 116.5 ft./sec.), and the fluidizing time was varied from 30 to 60 seconds. Two different particle size groups were tested: 0.375 inches and $-0.265$ inches. Varying the air flow rate through the fluidizing bed and varying the particle size of the feed material supplied to the fluidizing bed led to the results shown in FIGS. 2 through 4.

Figure 2:
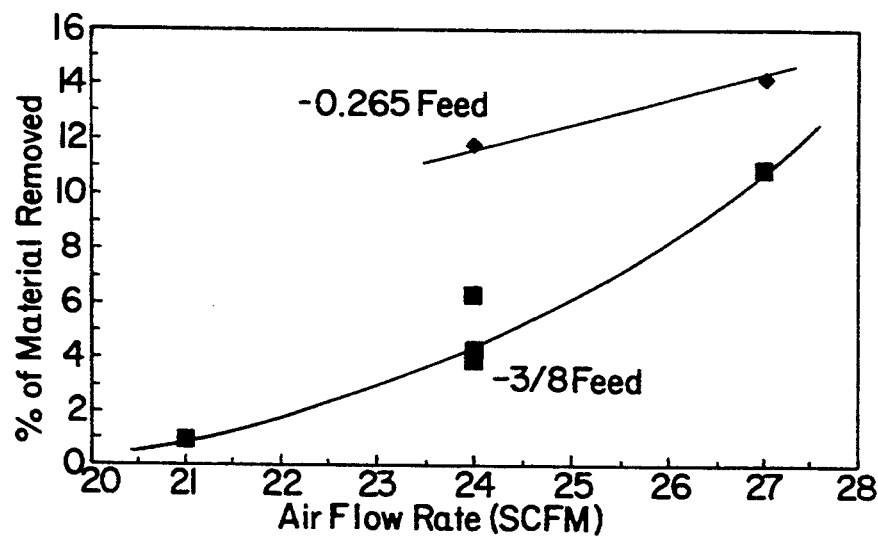
FIG. 2 is a graph showing the effect, for two particle sizes, of air flow rate on the quantity of fines removed in a fluidized bed of the type suitable for use in the flow diagram shown in FIG. 1.

FIG. 2 shows that the higher the air flow rate, the greater the weight percentage of fines removed from incoming particle stream 18. Additionally, the smaller the largest particle size of the incoming material, the larger the quantity of fines that is separated from the incoming material.

Figure 3:
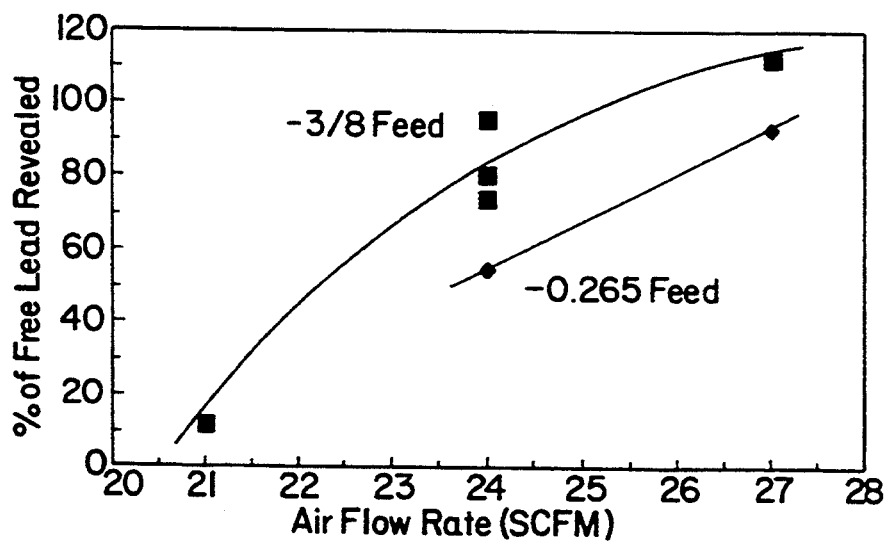
FIG. 3 is a graph showing the effect, for two particle sizes, of air flow rate on the quantity of free lead removed in a fluidized bed of the type suitable for use in the flow diagram shown in FIG. 1.

FIG. 3 shows the percentage of free lead removed from incoming particle stream 18 as a function both of particle size and of air flow rate.

Figure 4:
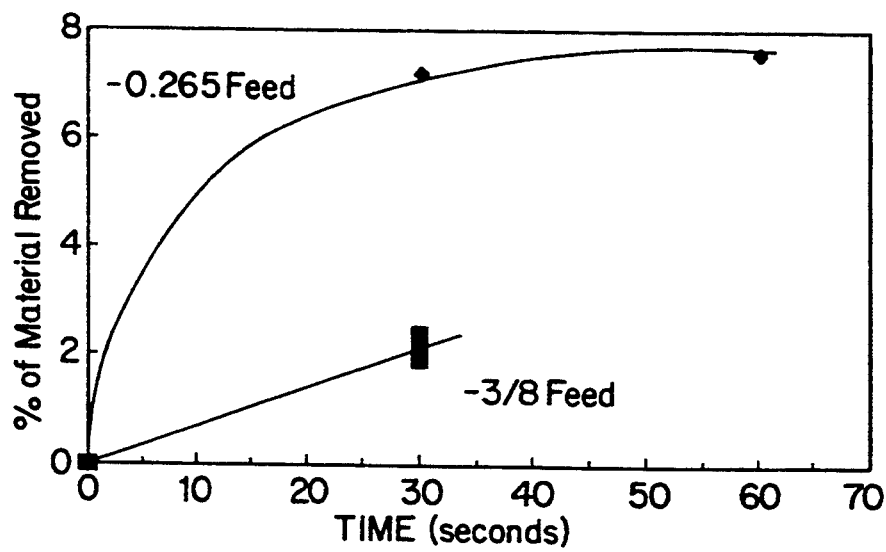
FIG. 4 is a graph showing the effect, for two particle sizes, of fluidizing time on the percentage of material removed in a fluidized bed of the type suitable for use in the flow diagram shown in FIG. 1.

FIG. 4 shows the effect of the fluidizing time on the weight percent of incoming particle stream 18 that is removed as fines in the fluidizing bed. The greater the fluidizing time, the greater the amount of fines removed. However, FIG. 4 also shows that above a fluidizing time of about 30 seconds, little additional material is removed.

Although particular embodiments of the present invention have been illustrated and described, it will be apparent to those skilled in the art that various changes and modifications can be made without departing from the spirit of the present invention. Accordingly it is intended to encompass within the appended claims all such changes and modifications that fall within the scope of the present invention.

What is claimed is:

1. A method of removing free lead form a mixture of materials including lead an recyclable aluminum alloy materials, said method comprising the steps of:
   a. providing a first particle stream including aluminum alloy particles and lead particles obtained by shredding used aluminum alloy cans and lead-containing materials;
   b. dividing the first particle stream into second and third particle streams, the second particle stream containing those particles from the first particle stream having a particle size smaller than a first particle size and the third particle stream containing those particles from the first particle stream having a particle size greater than the first particle size;
   c. fluidizing the second particle stream within a fluidized bed that is operated at a fluidizing gas velocity sufficient to separate from the second particle stream fines having a particle size less than a second particle size while allowing larger particles to remain within the bed, wherein the second particle size is smaller than the first particle size;

d. collecting the fines separated from the second particle stream by the fluidizing gas; and e. collecting the larger particles that remain within the fluidizing bed.

2. A method in accordance with claim 1 wherein the lead particles within the first particle stream have non-flat surfaces and the aluminum alloy particles include flat surfaces.

3. A method in accordance with claim 1 including the step of removing lacquer and decorative coatings from the aluminum alloy particles included in the first particle stream.

4. A method in accordance with claim 1 wherein the step of dividing the first stream into second and third particle streams is performed by depositing the first stream on a moving screen.

5. A method in accordance with claim 4 wherein the moving screen is a trommel that is rotated about its longitudinal axis.

6. A method in accordance with claim 4 including the step of removing lacquer and decorative coatings from the aluminum alloy particles included in the first particle stream.

7. A method in accordance with claim 6 wherein the coating removal step includes the step of agitating particles contained in the first particle stream while the particles are in a rotary kiln.

8. A method in accordance with claim 1 wherein the second particle stream has a maximum particle size of about ⅜ inch (9.5 mm).

9. A method in accordance with claim 1 wherein the mixture of materials includes lacquer and decorative coating materials associated with the recyclable aluminum alloy materials, said method including the step of introducing the first particle stream into a rotary kiln and heating the particles to a temperature above the melting temperature of lead and below the melting temperature of the aluminum alloy particles to melt the lead particles and remove lacquer and decorative coating materials from the aluminum alloy particles.

10. A method in accordance with claim 9 including the step of agitating the heated first particle stream to cause molten lead to separate from larger particles of the first particle stream and form at least a part of the second particle stream.

11. A method of reducing the weight fraction of a minor metallic constituent of a starting material mixture of the minor metallic constituent and a second metal, each of the minor metallic constituent and second metal having different melting points, said method comprising the following steps:

a. providing a starting material mixture in particulate form including particles of the minor metallic constituent and particles of the second metal;

b. introducing the starting material mixture into a rotary kiln and heating the particles contained in the mixture to a temperature above the melting temperature of the minor metallic constituent and below the melting temperature of the second metal;

c. agitating the heated particles to cause molten minor metallic constituent material to separate from non-molten, heated particles of the second metal;

d. dividing the heated particles into a first heated particle stream of larger particles of the second metal that have a particle size greater than a first particle size, and a second heated particle stream including small particles of the second metal having a particle size less than the first particle size and including particles of the minor metallic constituent to provide a fine particle feed stream;

e. fluidizing the second heated particle stream to separate particles of the minor metallic constituent from the small particles of the second metal;

f. collecting the fluidized particles for processing; and g. separately collecting the non-fluidizing particles.

12. A method of reducing the weight fraction of lead in a particle stream of shredded aluminum beverage containers contaminated with lead, said method comprising the following steps:

a. providing an initial particle feed stream of shredded aluminum beverage containers contaminated with lead;

b. introducing the initial particle feed stream into a rotary kiln and heating the particles to a temperature above the melting temperature of lead and below the incipient melting temperature of the aluminum alloy or alloys forming the aluminum beverage contains to melt the lead;

c. agitating the initial particle feed stream after heating to form reduced size lead particles from lead present in the initial particle feed stream; and d. separating from the agitated particle feed stream particles having a particle size less than a first particle size to provide a fine particle feed stream containing a concentration of lead greater than the concentration of lead in the initial particle feed stream and to provide a coarse particle stream of shredded aluminum beverage containers having a particle size greater than the first particle size and having reduced weight fraction of lead.

13. The method of claim 12 further comprising:

a. fluidizing the fine particle feed stream to separate reduced size particles of lead therefrom;

b. collecting the fluidized particles; and c. collecting the non-fluidized particles, the non-fluidized particles having a lead content less than the lead content of the fluidized particles.

14. The method of claim 12 further comprising feeding the initial particle stream to a trommel for the steps of agitating and separating.

* * * * *